United States Patent [19]

Nepote

[11] Patent Number: 5,329,209

[45] Date of Patent: Jul. 12, 1994

[54] SELF-OSCILLATING CIRCUIT FOR DRIVING A GAS DISCHARGE LAMP, PARTICULARLY FOR USE ON BOARD A MOTOR VEHICLE

[75] Inventor: Andrea Nepote, Turin, Italy

[73] Assignee: Marelli Autronica S.p.A., Milan, Italy

[21] Appl. No.: 980,589

[22] Filed: Nov. 23, 1992

[30] Foreign Application Priority Data

Dec. 11, 1991 [IT] Italy .................. TO91A000964

[51] Int. Cl.$^5$ .................................... H05B 37/02
[52] U.S. Cl. ........................ 315/209 R; 315/219; 315/307; 315/224; 315/DIG. 7
[58] Field of Search ............... 315/219, 307, DIG. 7, 315/209 R, 224, 244, 205

[56] References Cited

U.S. PATENT DOCUMENTS

| | | | |
|---|---|---|---|
| 4,039,897 | 8/1977 | Dragoset | 315/205 |
| 4,700,113 | 10/1987 | Stupp et al. | 315/219 X |
| 4,935,673 | 6/1990 | Vila-Masot et al. | 315/219 |
| 5,051,660 | 9/1991 | Domann et al. | 315/219 |
| 5,065,072 | 11/1991 | Albou et al. | 315/DIG. 7 X |

FOREIGN PATENT DOCUMENTS

| | | |
|---|---|---|
| WO A88/09108 | 11/1988 | PCT Int'l Appl. |
| 0311424 | 4/1989 | PCT Int'l Appl. |
| 2137780 | 10/1984 | United Kingdom |

Primary Examiner—Robert J. Pascal
Assistant Examiner—Haissa Philogene
Attorney, Agent, or Firm—Fish & Richardson

[57] ABSTRACT

The circuit including a capacitor which is alternately discharged and charged in synchronism with the signal which develops across the terminals of a resistor operating to detect the current in the lamp. A sawtooth wave form is thus obtained, which is compared with a threshold level which is varied in dependence on the current which it is necessary to provide to the lamp. On the basis of this comparison logic signals are produced which are utilized to control the power switches of the inverter which controls the lamp.

2 Claims, 6 Drawing Sheets

SELF-OSCILLATING CIRCUIT FOR DRIVING A GAS DISCHARGE LAMP, PARTICULARLY FOR USE ON BOARD A MOTOR VEHICLE

BACKGROUND OF THE INVENTION

The present invention relates to a self-oscillating circuit for driving a gas discharge lamp, particularly for use in motor vehicle headlights or spotlights.

More specifically, the invention relates to a self-oscillating circuit comprising an inverter having two circuit branches connectable to a DC voltage source and including respective electronic switching means in series with a respective primary winding; the primary windings of the circuit branches being inductively coupled to the same secondary winding connected to the lamp;

an impedance in which variable as a function of frequency, connected in series with the lamp; and control circuit means operable to render the electronic switch means alternately conductive in such a way that an alternating voltage develops across the terminals of the said secondary winding, the control circuit means having a control input intended to receive a control signal to cause a variation in the frequency of the alternating voltage in such a way as to cause a corresponding variation of the impedance and a consequent variation of the current flowing through the lamp;

a current sensor resistor connected in series with the lamp and connected to the said control circuit means;

the said control circuit means including signal treatment circuit means connected to the terminals of the said resistor and operable to provide at its output a square wave signal at the same frequency as the signal developed across the terminals of this resistor.

A self-oscillating circuit for driving a gas discharge lamp of the type specified above is described in earlier Italian Patent Application No. T091A000549. In this circuit the signal treatment circuit means are arranged to provide first and second square wave signals, respectively in phase and in phase opposition with the signal developed across the terminals of the current sensor resistor. These square wave signals are utilised to control the charging and discharging of two capacitors to generate first and second ramp signals in phase with the first and second square wave signal respectively. The ramp signals thus generated are compared with a reference level which varies in dependence on an external control signal. On the basis of the result of this comparison pilot signals are generated for the electronic switches of the two circuit branches of the inverter.

In the above described self-oscillating circuit disadvantages can arise if the two capacitors utilised to generate the ramp signals have different capacity values.

SUMMARY OF THE INVENTION

The object of the present invention is to provide a self-oscillating circuit with which this disadvantage can be avoided.

This object is achieved according to the invention by means of a self-oscillating circuit of the previously specified type, the main characteristic of which lies in the fact that the control circuit means further comprise:

second signal treatment circuit means including a single capacitor and operable to provide a triangular wave signal in phase with the square wave signal; and comparison and processing circuit means operable to generate first and second logic control signals capable of rendering the electronic switching means of the first and second circuit branches of the inverter conductive in a manner which depends upon the comparison of the triangular wave signal with a reference level which is variable in dependence on the external control signal.

Further characteristics and advantages of the invention will become apparent from the following detailed description, given with reference to the attached drawings provided purely by way of non-limitative example, in which:

DESCRIPTION OF PREFERRED EMBODIMENTS

Figure 1:
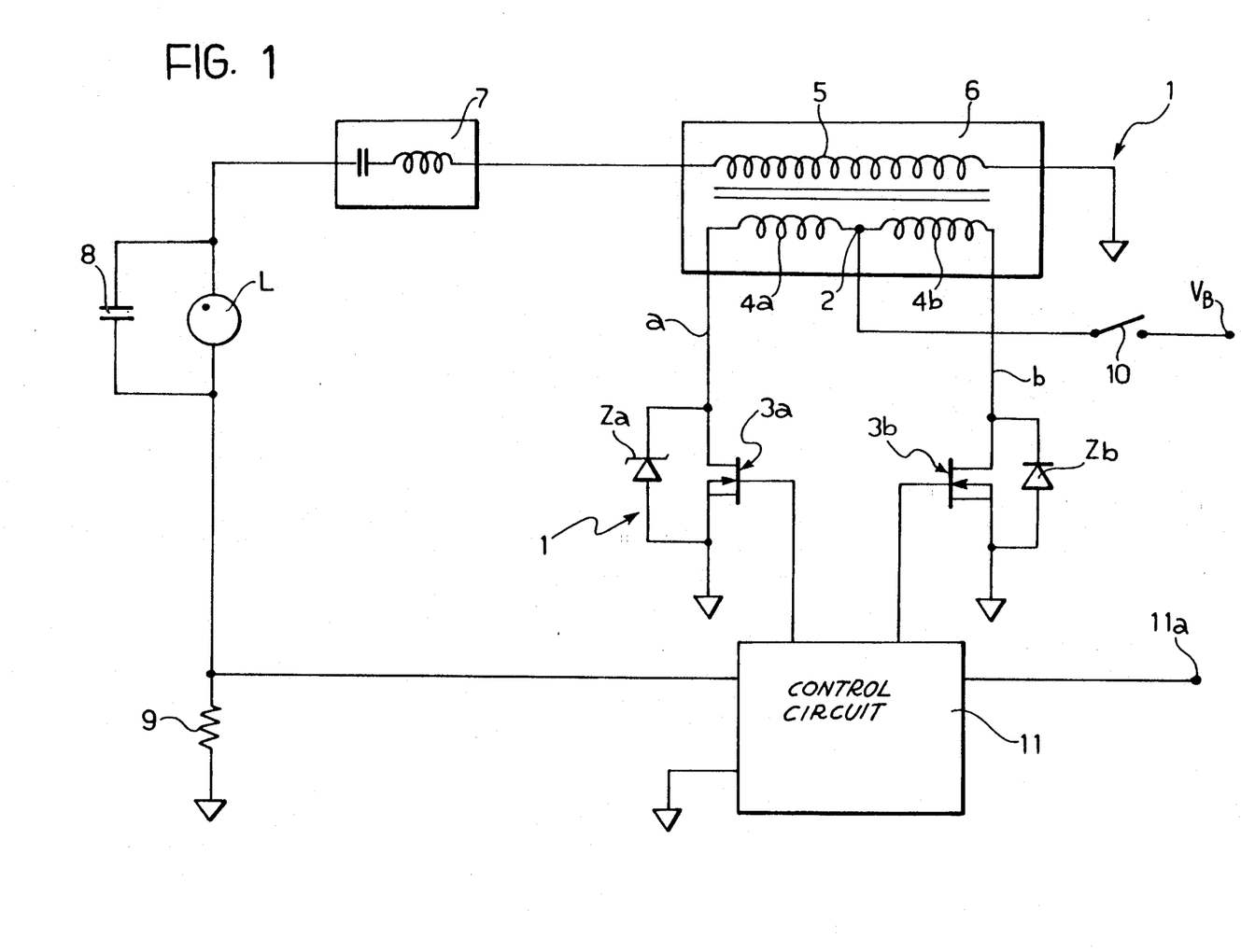
FIG. 1 is a circuit diagram, partially block diagram form, of a self-oscillating circuit according to the invention.

In FIG. 1, the reference L indicates a gas discharge lamp usable in a spotlight or front headlight of a motor vehicle.

Associated with this lamp is a control circuit of self-oscillating type which includes an inverter generally indicated 1. This inverter has two circuit branches a and b between a terminal 2 and earth.

The circuit branches include respective MOSFET transistors 3a, 3b with associated shunt ZENER diodes Za and Zb. These diodes are conveniently constituted by the so-called "parasitic diodes" inherent in MOSFET transistors themselves.

In series with the drain-source path of the transistors 3a, 3b in the two circuit branches are connected two primary windings 4a and 4b. These windings are inductively coupled to the same secondary winding 5 with which they form a transformer generally indicated 6.

The secondary winding 5 is connected between earth and an impedance 7 of resonant L-C type connected in series with the lamp L.

A capacitor 8 is connected in parallel with the lamp L.

A resistor 9, functioning as a sensor for detecting the current which flows in the lamp L in operation is connected between the lamp and earth.

Reverting to the inverter 1, the terminal 2 to which the primary windings 4a and 4b are connected is connectable to a DC voltage source $V_b$ (for example the battery on board the motor vehicle) via a control switch 10.

The gate terminals of the transistors 3a, 3b are connected to corresponding outputs of an electronic control circuit generally indicated 11 in FIG. 1. This circuit has an input 11a intended to receive an external control signal indicative of the current which has to flow through the lamp L. This current can for example be of greater intensity in phases immediately after the lamp is lit to allow a rapid heating thereof.

As will appear more clearly below, when the switch 10 is closed the inverter 1 is connected to the DC voltage source $V_b$.

The control circuit 11 now renders the transistors 3a and 3b conductive alternately, and consequently an alternating voltage develops across the terminals of the secondary winding 5 of the transformer 6.

This voltage causes the flow of an alternating current through the impedence 7, the lamp L and the resistor 9. The control circuit 11 determines the frequency of this alternating current in dependence on the signal applied to its control input 11a.

The impedance of the resonant circuit 7 varies with a variation in the frequency of the alternating voltage which is produced in the secondary winding 5. Consequently a corresponding variation in the alternating current flowing through the lamp and the resistor 9 is caused.

Figure 2:
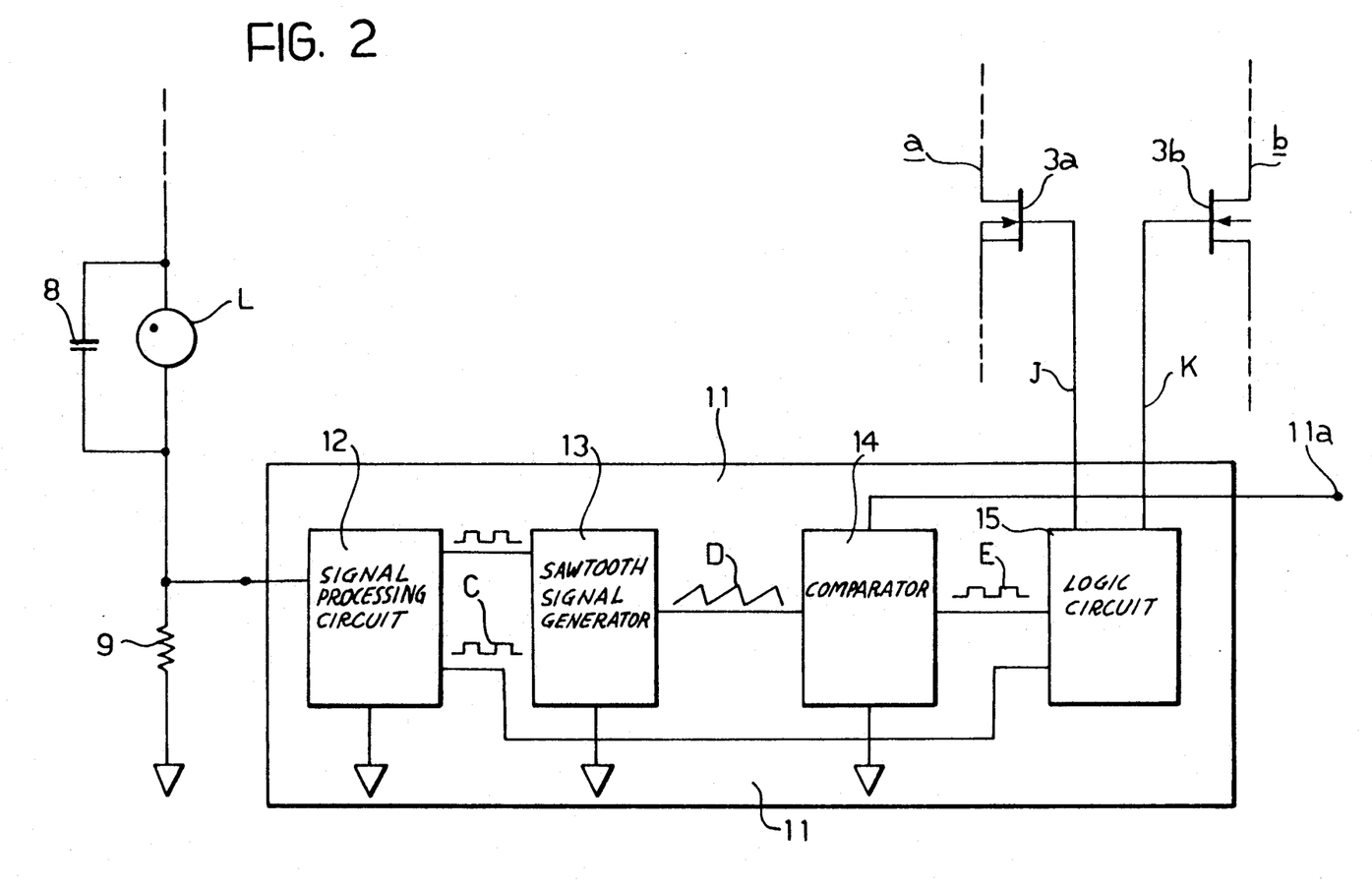
FIG. 2 is a circuit diagram which shows the internal structure of a control circuit contained in the self-oscillating circuit of FIG. 1.
Figure 6:
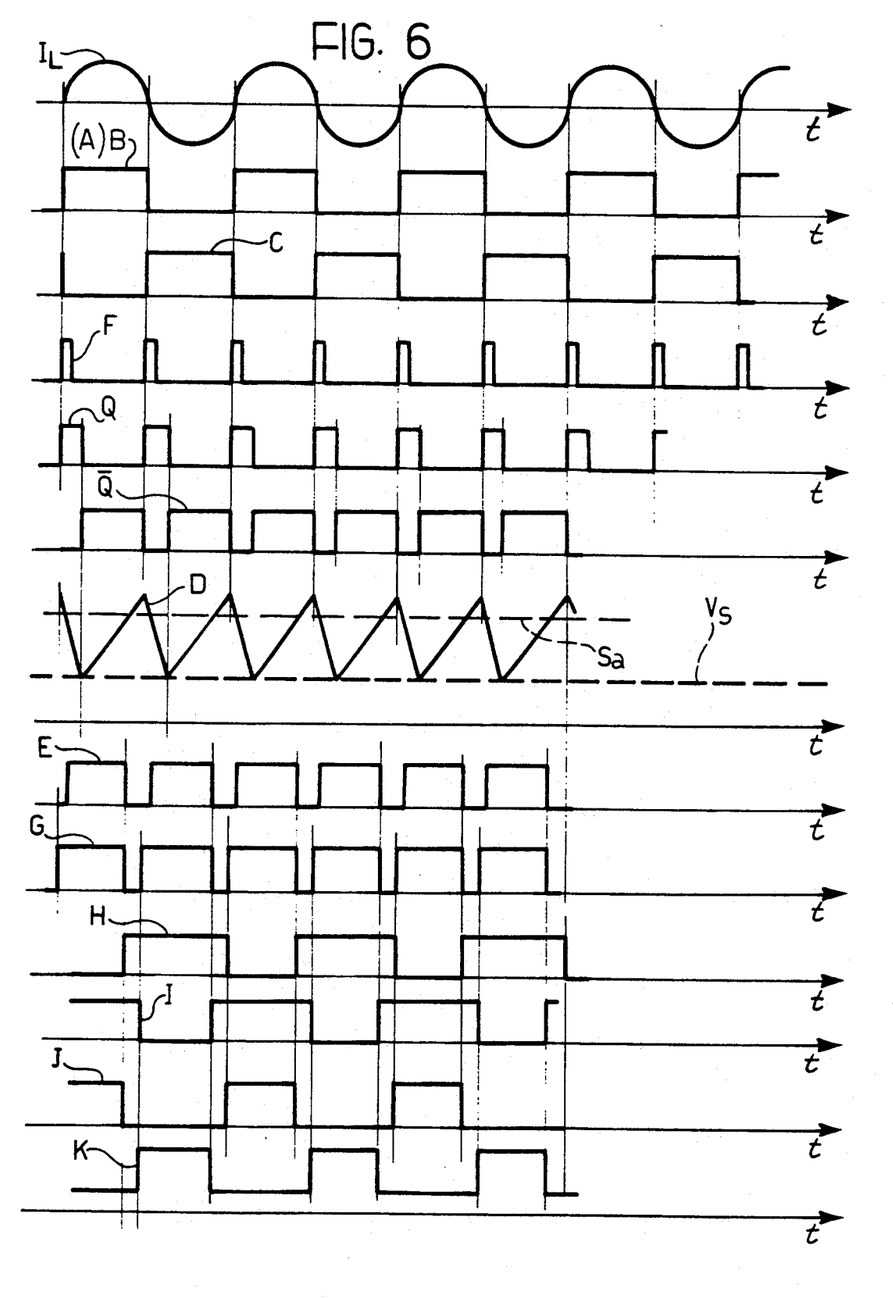
FIG. 6 shows thirteen exemplary signals developed in the operation of the circuit according to the invention.

In FIGS. 2 and 6 the current flowing in the resistor 9 has been indicated $I_L$. This current is substantially equal to the current flowing through the lamp L.

The control circuit 11 includes a signal treatment circuit 12 for treatment of the signal $I_L$.

As will become apparent more clearly below, the circuit 12 is arranged to provide at its output two square wave signals B and C at the same frequency as the signal $I_L$ and respectively in phase and in phase opposition with respect to it.

The signal B is applied to the input of a second signal treatment circuit generally indicated 13 in FIG. 2.

This circuit provides at its output a triangular wave or sawtooth signal of twice the frequency of the signal B, indicated D in FIGS. 2 and 6.

The output of the circuit 13 is connected to a comparison circuit 14 which compares the signal D with a reference signal $s_a$ which is variable in dependence on the external control signal applied to the input 11a of the control circuit 11.

The comparison circuit 14 provides at its output a signal E (FIG. 6) which is applied to an input of a logic circuit 15 to which the signal C is also supplied. On the basis of the signals E and C the logic circuit 15 provides at its output two signals J and K which are applied to the gates of the transistors 3a and 3b for the purpose of controlling its conduction.

Figure 3:
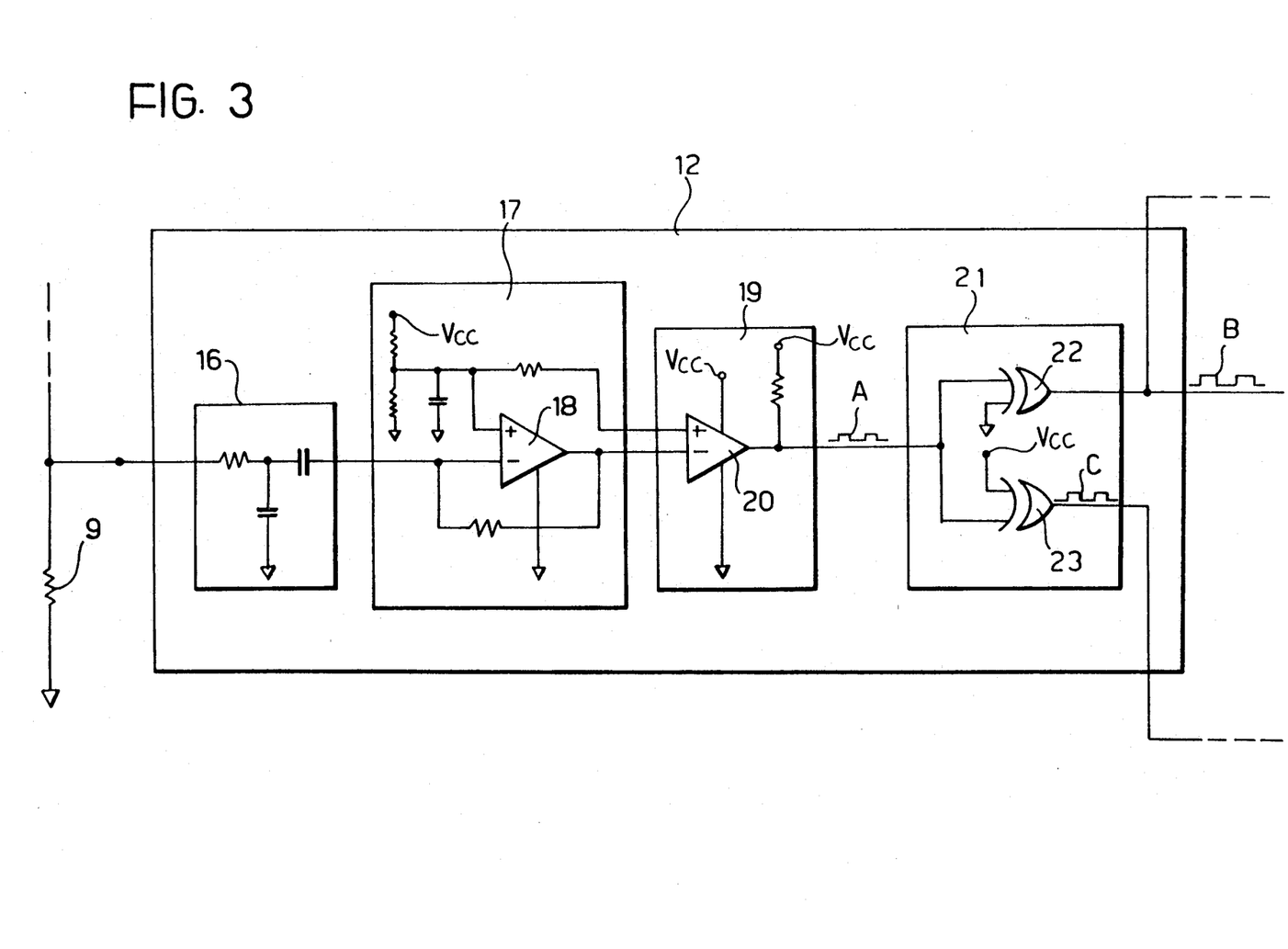
FIG. 3 is a circuit diagram which shows the detailed structure of an embodiment of a first signal-treatment circuit in the control circuit shown in FIG. 2.

In FIG. 3 there is shown an embodiment of the treatment circuit 12 for treatment of the signal developed across the terminals of the resistor 9.

In this embodiment the circuit 12 includes an input filter 16 of R-C type followed by an amplifier circuit 17 formed by an operational amplifier 18 which amplifies the received signal and shifts its level (by introducing an offset) so as to render this signal unidirectional, for example totally positive.

The amplifier circuit 17 is followed by a squaring circuit 19 formed, in a manner known per se, by a comparator 20. In operation, at the output of the circuit 19 there is available a signal A (FIGS. 3 and 6) of square wave form which is at the same frequency and in phase with the signal $I_L$.

The output of the squaring circuit 19 is connected to the input of a logic circuit 21 which in the exemplary embodiment illustrated simply comprises two EXOR gates 22 and 23.

The EXOR gate 22 has one input connected to the output of the squaring circuit 19 and the other input connected to earth.

The EXOR gate 23 has one input connected to the output of the squaring circuit 19 and the other input connected to a DC voltage source $V_{cc}$, corresponding to the logic "high" level.

Consequently, these EXOR gates 22 and 23 provide at their outputs signals, indicated B and C in FIGS. 3 and 6. The signal B is at the same frequency and in phase with the signal A whilst the signal C is in phase opposition to the signal B.

Figure 4:
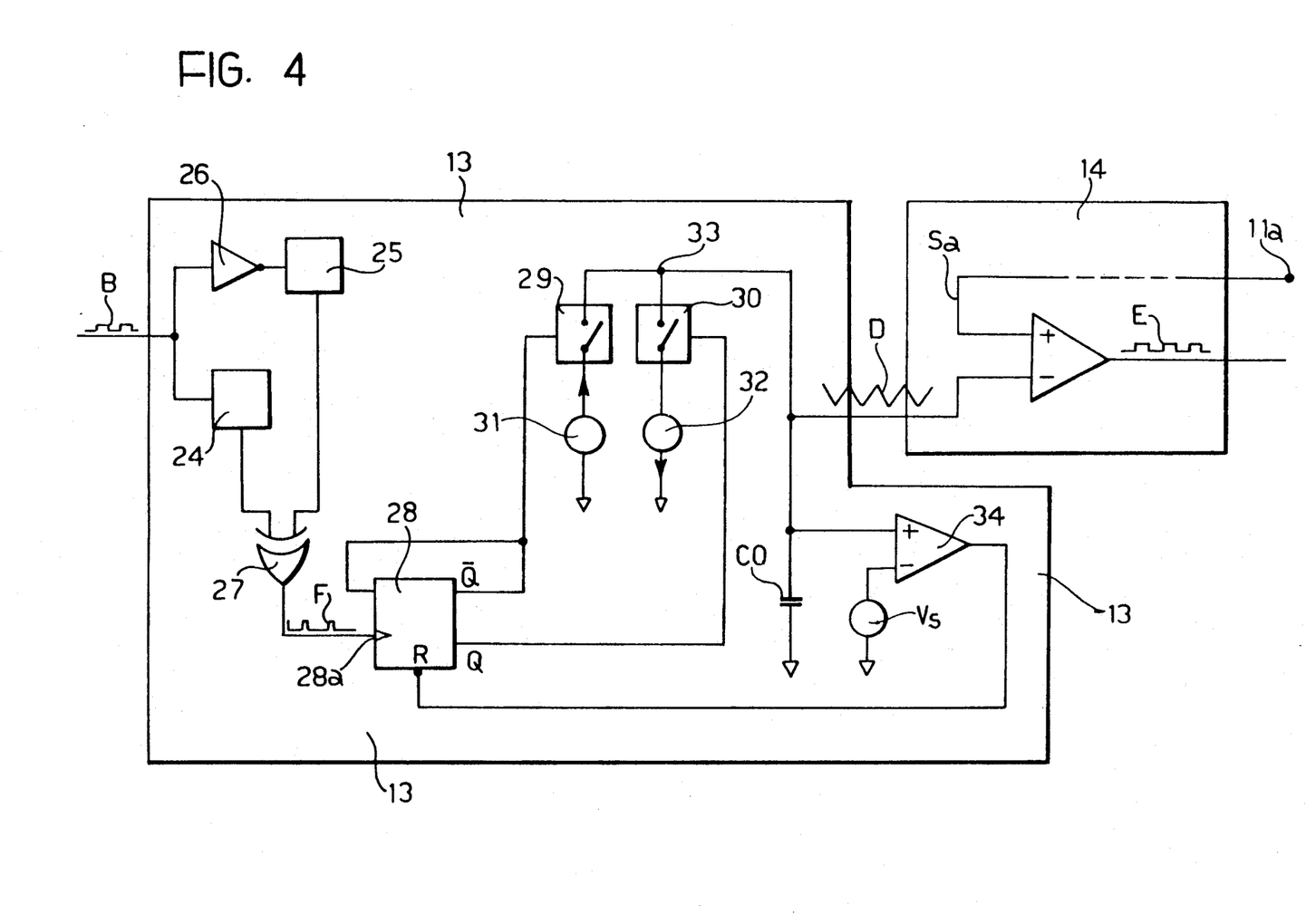
FIG. 4 is a circuit diagram which shows a embodiment of a second signal treatment circuit and a comparison circuit included in the control circuit of FIG. 2.

In the embodiment illustrated in FIG. 4 the circuit 13 includes two monostable circuits 24, 25 to the input of which the signal B is applied directly, and via an inverter 26 respectively. In operation each of these monostables emits from its output a narrow pulse in correspondence with each rising edge of the signal applied to its input.

The outputs of the monostable circuits 24 and 25 are connected to the inputs of an EXOR gate 27.

In operation, at the output of the EXOR gate 27 there appears a pulse signal which is shown in FIG. 6. This signal has, in particular, a pulse in correspondence with each passage through zero of the current $I_L$ in the resistor 9.

The output of the EXOR gate 27 is connected to the input 28a of a D type "toggle" bistable 28.

The Q and $\overline{Q}$ outputs of this bistable circuit are connected to the control inputs of two electronic switches 29 and 30 disposed in series with respective current generators 31 and 32 between a node 33 and earth.

A capacitor connected between the node 33 and earth is indicated CO.

When in operation the output O(O) of the bistable device 28 is at level "1", the associated electronic switch 30 (29) is conductive and couples the current generator 32 (31) to the capacitor CO.

The current generator 32, which in the following will be defined as the discharge generator, generates a DC current which flows towards earth. The generator 31, hereinafter defined as the charging generator generates a DC current flowing towards the node 33.

To the node 33 there is further connected the input of a comparator 34 which in the exemplary embodiment illustrated is of the non-inverting type. This comparator compares the value of the voltage (with respect to earth) on the capacitor CO with a constant reference value produced by a generator $V_s$. When the voltage on the capacitor CO falls below the value $V_s$ the output of the comparator 34 applies a reset command to the reset input R of the bistable device 28.

In operation each pulse of the signal F applied to the bistable device causes the output C of this device to rise to the "high" level. Consequently the electronic switch 30 is "closed" whilst the switch 29 is "open". In this situation the current generator 32 causes a partial discharge of the capacitor CO. This discharge continues until the voltage on the capacitor CO reaches the lower threshold $V_s$: when this occurs the comparator 34 causes the bistable device 28 to reset. The output Q of this device goes to the "low" level and correspondingly the switch 30 becomes "open" whilst the switch 29 becomes "closed". The current generator 31 is now coupled to the capacitor CO, and recharges it. The recharging of the capacitor by operation of the generator 31 continues until arrival of the subsequent pulse of the signal F, which causes a new change of state of the outputs Q and O of the bistable device 28.

The voltage across the terminals of the capacitor CO then assumes a periodic variation with a sawtooth waveform as is shown by the waveform D in FIG. 6. The sawtooth signal D is applied to the input of a comparator circuit 14, which in the embodiment shown in FIG. 4 is of inverting type. This comparator compares the signal D with a threshold level $S_a$ which varies as a function of the external control signal applied to the control input 11a.

Correspondingly, a square wave signal, indicated E in FIG. 6, is made available at the output of the comparator 14.

Figure 5:
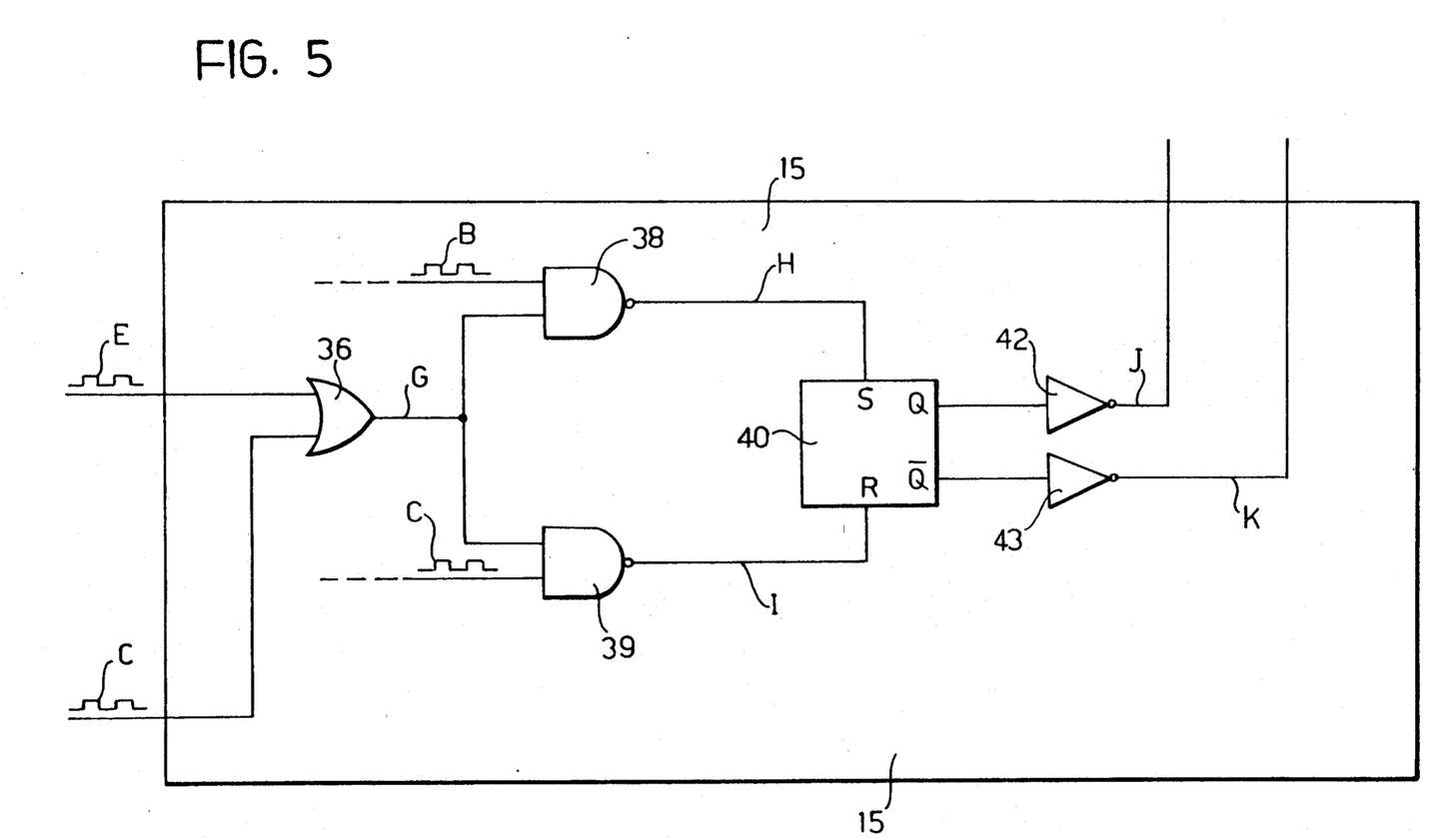
FIG. 5 is a circuit diagram which shows an embodiment of a logic circuit contained in the control circuit of FIG. 2.

With reference to FIG. 5, the signals E and C are applied to the input of an OR circuit 36 the output of which is connected to first inputs of two NAND gates 38 and 39. The NAND gate 38 receives the signal B on its other input. The NAND gate 39 receives the signal C on its other input. In operation, at the outputs of the gates 36, 38 and 39 appear the signals G, H and I respectively, the variations of which are shown in FIG. 6.

The outputs of the NAND gates 38 and 39 are connected to the set input (S) and reset input (R) of a bistable circuit 40. This circuit is conveniently a D-type flip-flop in a set/reset configuration. This circuit provides at its output two signals the waveforms of which substantially correspond to those of the signals H and I. This circuit, however, ensures that the switching of these signals occurs in a correct sequential manner.

The outputs Q and $\overline{Q}$ of the bistable circuit 40 are connected to the gates of transistors 3a and 3b via respective logic inverters 42 and 43.

At the output of the inverters, therefore, the pilot signals J and K appear, the waveforms of which signals are shown in FIG. 6. The signals J and K cause alternate conduction of the transistors 3a and 3b as already mentioned hereinbefore with reference to FIG. 1.

If in operation it is necessary to cause an increase in the current flowing in the lamp L, the external control signal applied to the input 11a of the control circuit 11 causes the threshold level $S_a$ associated with the threshold comparator 14 to rise. This consequently causes a variation in the conduction times of the transistors 3a and 3b.

Naturally, the principle of the invention remaining the same, the embodiments and details of construction can be widely varied with respect to what has been described and illustrated purely by way of non-limitative example, without by this departing from the ambit of the present invention.

In particular, the circuit of the invention can be formed at least in part by using integrated digital components or by a microprocessor. In place of the sawtooth signal generator circuit digital counters can be utilised, in particular counters of the incremental-decremental type, and comparison devices likewise of digital type.

What is claimed is:

1. A self-oscillating circuit for driving a gas discharge lamp particularly for use on board a motor vehicle, comprising an inverter with first and second circuit branches connectable to a DC voltage source and comprising respective electronic switch means in series with respective primary windings; the primary windings of said first and second circuit branches being inductively coupled to the same secondary winding connected to the lamp;

an impedance variable as a function of the frequency, connected in series with the lamp;

control circuit means operable to render said electronic switch means alternately conductive in such a way that an alternating voltage develops across the terminals of the secondary winding; said control circuit means having a control input intended to receive a control signal operable to cause a variation in the frequency of the alternating voltage in such a way as to cause a corresponding variation of the impedance and a consequent variation in the current flowing through the lamp;

a current sensor resistor connected in series with the lamp and connected to said control circuit means;

said control circuit means including first signal treatment means connected to said resistor and operable to provide at its output a square wave signal at the same frequency as the signal developed across the terminals of this resistor;

said control circuit means further including a single capacitor, operable to provide a triangular wave signal in phase with the square wave signal and comparison and processing circuit means operable to generate first and second logic control signals capable of rendering the electronic switch means of said first and second circuit branches conductive in a manner which depends on the comparison of the triangular wave signal with a reference level which is variable in dependence on the control signal.

2. A self-oscillating circuit according to claim 1, wherein said second signal treatment means include:

a capacitor, means for detecting the voltage across terminals of said capacitor; and control circuit means operable to couple a current generator to the capacitor to cause successive charging and discharging cycles of this capacitor; said control circuit means being arranged to cause a discharge of the capacitor each time the current flowing in the lamp passes through zero until a predetermined minimum voltage is reached on the capacitor, and then recharging of the capacitor until the subsequent passage of the current through zero.

* * * * *

UNITED STATES PATENT AND TRADEMARK OFFICE
CERTIFICATE OF CORRECTION

PATENT NO. : 5,329,209
DATED : July 12, 1994
INVENTOR(S) : Andrea Nepote

It is certified that error appears in the above-indentified patent and that said Letters Patent is hereby corrected as shown below:

Col. 1, lines 23, 30, 31 and 33, delete "said".

Col. 4, line 36, change "O(O)" to --Q(Q)--.

Col. 5, line 2, change "O" to --Q--.

Signed and Sealed this

Nineteenth Day of December, 1995

Attest:

BRUCE LEHMAN

Attesting Officer

Commissioner of Patents and Trademarks